(12) United States Patent
Dodds et al.

(10) Patent No.: US 11,345,111 B2
(45) Date of Patent: May 31, 2022

(54) COMPOSITE

(71) Applicant: Baker Hughes Energy Technology UK Limited, Nailsea (GB)

(72) Inventors: Neville Dodds, Newcastle-upon-Tyne (GB); Vineet Kumar Jha, Newcastle-upon-Tyne (GB); James Robert Latto, Newcastle-upon-Tyne (GB); David Andrew Finch, Newcastle-upon-Tyne (GB)

(73) Assignee: Baker Hughes Energy Technology UK Limited, Nailsea (GB)

( * ) Notice: Subject to any disclaimer, the term of this patent is extended or adjusted under 35 U.S.C. 154(b) by 135 days.

(21) Appl. No.: 15/117,381

(22) PCT Filed: Feb. 9, 2015

(86) PCT No.: PCT/GB2015/050355
§ 371 (c)(1),
(2) Date: Aug. 8, 2016

(87) PCT Pub. No.: WO2015/118356
PCT Pub. Date: Aug. 13, 2015

(65) Prior Publication Data
US 2016/0347023 A1    Dec. 1, 2016

(30) Foreign Application Priority Data

Feb. 10, 2014    (GB) .................................... 1402264

(51) Int. Cl.
*B32B 1/08*    (2006.01)
*B32B 27/08*    (2006.01)
(Continued)

(52) U.S. Cl.
CPC ................ *B32B 1/08* (2013.01); *B32B 27/08* (2013.01); *B32B 27/20* (2013.01); *B32B 27/304* (2013.01);
(Continued)

(58) Field of Classification Search
CPC .... B32B 3/06; B32B 1/08; B32B 5/06; B32B 7/04; B32B 7/12; B32B 27/20;
(Continued)

(56) References Cited

U.S. PATENT DOCUMENTS 3,928,684 A * 12/1975 Buning ...................... C08J 5/08
442/108
4,044,188 A * 8/1977 Segal .................... B29C 70/025
428/297.4
(Continued)

FOREIGN PATENT DOCUMENTS

DE    4310159 A1    10/1993
DE    10014704 A1    9/2000
(Continued)

OTHER PUBLICATIONS

Sing, Kenneth. "The Use of Nitrogen Adsorption for the Characterisation of Porous Materials." Colloids and Surfaces A: Physicochemical and Engineering Aspects, vol. 187-188, 2001, pp. 3-9., doi:10.1016/s0927-7757(01)00612-4. (Year: 2001).*
(Continued)

*Primary Examiner* — Lee E Sanderson
*Assistant Examiner* — Michael C Romanowski
(74) *Attorney, Agent, or Firm* — Klarquist Sparkman, LLP

(57)    ABSTRACT

A composite for use in a flexible pipe body, said composite comprising: a first polymer layer, a second polymer layer that is bonded to the first polymer layer, and filler particles that extend from the first polymer layer into the second
(Continued)

Figure 1:
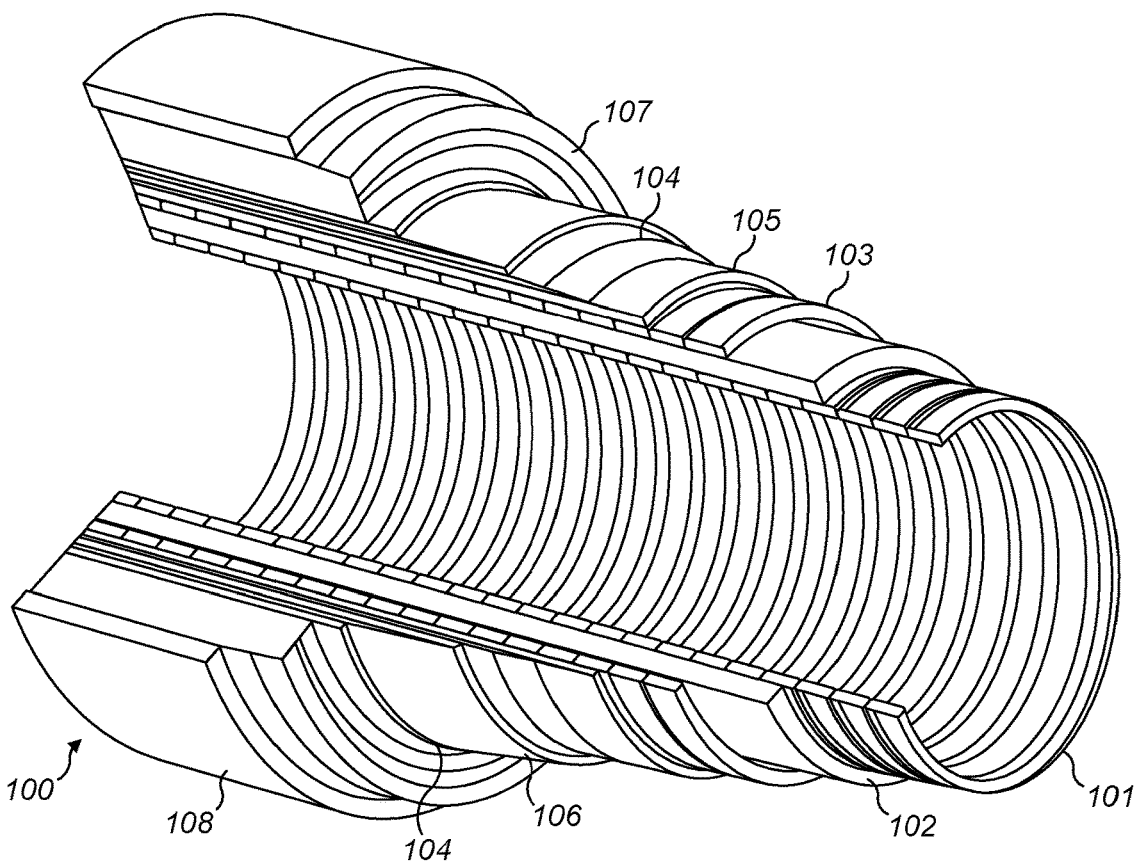

polymer layer, whereby the particles are partially embedded in both the first and second polymer layers.

5 Claims, 1 Drawing Sheet

(51) Int. Cl.
    *B32B 27/20*     (2006.01)
    *B32B 27/34*     (2006.01)
    *B32B 27/30*     (2006.01)
    *F16L 11/08*     (2006.01)
    *F16L 11/12*     (2006.01)

(52) U.S. Cl.
    CPC .............. *B32B 27/34* (2013.01); *F16L 11/08* (2013.01); *F16L 11/12* (2013.01); *B32B 2597/00* (2013.01)

(58) Field of Classification Search
    CPC ... B32B 27/12; B32B 27/304; B32B 27/2597; B32B 2597/00; B29C 53/56–845; F16L 11/12; F16L 11/127; Y10T 442/2041
    USPC ............. 428/35.7, 34.1–36.92; 138/141, 153
    See application file for complete search history.

(56) References Cited

U.S. PATENT DOCUMENTS

| | | | | |
|---|---|---|---|---|
| 4,800,928 A * | 1/1989 | Kanao | .................... | F16L 11/16 138/122 |
| 5,080,963 A * | 1/1992 | Tatarchuk | .............. | H01G 11/26 428/605 |
| 5,637,375 A * | 6/1997 | Hohman | ................ | B29C 70/081 428/113 |
| 6,149,969 A | 11/2000 | Gibson | | |
| 6,491,779 B1 * | 12/2002 | Bryant | ................ | B32B 37/1284 156/169 |
| 2002/0185188 A1 * | 12/2002 | Quigley | .................... | B32B 1/08 138/137 |
| 2004/0058113 A1 * | 3/2004 | Werth | .................... | B32B 27/34 428/36.91 |
| 2006/0127620 A1 * | 6/2006 | Fisher | .................... | F16L 11/127 428/36.91 |
| 2007/0036926 A1 * | 2/2007 | Fish | ........................ | B32B 27/08 428/36.91 |
| 2008/0085388 A1 * | 4/2008 | Tynan | ....................... | B32B 7/12 428/354 |
| 2008/0319095 A1 * | 12/2008 | Iwa | ....................... | C08G 18/168 521/137 |
| 2009/0151805 A1 * | 6/2009 | Martino | .................. | F16L 11/12 138/125 |
| 2010/0189946 A1 * | 7/2010 | Hochstetter | ........... | C08F 259/08 524/415 |
| 2010/0218839 A1 * | 9/2010 | Conley | ..................... | B32B 1/08 138/130 |
| 2013/0056108 A1 * | 3/2013 | Wood | .................. | B29C 71/0063 138/140 |
| 2013/0273288 A1 * | 10/2013 | Luo | ......................... | C08L 81/04 524/502 |
| 2015/0224739 A1 * | 8/2015 | Joo | ........................ | D04H 1/728 428/113 |
| 2016/0215134 A1 * | 7/2016 | Bonnet | ..................... | C08K 7/02 |

FOREIGN PATENT DOCUMENTS

| | | | | |
|---|---|---|---|---|
| EP | 1125731 A1 | 8/2001 | | |
| FR | 1493562 A | 9/1967 | | |
| GB | 621867 | * | 5/1946 | ............. B32B 27/00 |
| GB | 621867 A | * | 4/1949 | ............. B32B 27/00 |
| GB | 621867 A | | 4/1949 | |

OTHER PUBLICATIONS

Trunschke,A."Modern Methods in Heterogeneous Catalysis Research-Surface Area and Pore Size Determination" AC FHI, Nov. 1, 2013, pp. 1-52, http://www.fhi-berlin.mpg.de/acnew/department/pages/teaching/pages/teaching__wintersemester__2013_2014/annette_trunschke__surface_area_and_pore_analysis__131101.pdf (Year: 2013).*

International Search Report and Written Opinion of the International Searching Authority, dated Apr. 14, 2015, for corresponding International Application No. PCT/GB2015/050355, 8 pages.

United Kingdom Search Report from United Kingdom Intellectual Property Office for United Kingdom Patent Application No. GB 1402264.4, dated Aug. 7, 2014, 4 pages.

* cited by examiner

COMPOSITE

CROSS REFERENCE TO RELATED APPLICATIONS

This is the U.S. National Stage of International Application No. PCT/GB2015/050355, filed Feb. 9, 2015, which in turn claims the benefit of and priority to U.K. Application No. GB1402264.4, filed Feb. 10, 2014.

The present invention relates to a composite for use in a flexible pipe body. The present invention also relates to a flexible pipe body comprising such a composite, as well as to a method of producing such a composite.

Traditionally flexible pipe is utilised to transport production fluids, such as oil and/or gas and/or water, from one location to another. Flexible pipe is particularly useful in connecting a sub-sea location (which may be deep underwater) to a sea level location. The pipe may have an internal diameter of typically up to around 0.6 metres (e.g. 0.05 m to 0.6 m). Flexible pipe is generally formed as an assembly of a flexible pipe body and one or more end fittings. The pipe body is typically formed as a combination of layered materials that form a pressure-containing conduit. The pipe structure allows large deflections without causing bending stresses that impair the pipe's functionality over its lifetime. The pipe body is generally built up as a combined structure including polymer, composite and/or metallic layers. For example, a pipe body may include polymer, composite and/or metal layers.

Suitable polymers for forming the polymer layers in the pipe body include polyethylene, polyamides and polyvinylidene fluoride (PVDF). It may be desirable to bond two polymer layers together to provide a composite with improved properties. However, it may sometimes be difficult to form an adequate bond between certain polymer layers, for example, when the layers of polymer are incompatible with one another.

According to a first aspect of the present invention, there is provided a composite for use in a flexible pipe body, said composite comprising:
  a first polymer layer,
  a second polymer layer that is bonded to the first polymer layer, and
  filler particles that extend from the first polymer layer into the second polymer layer, whereby the particles are partially embedded in both the first and second polymer layers.

The present invention also provides a flexible pipe body comprising a composite as described herein.

In the composite of the present invention, filler particles are embedded in both the first and second polymer layers. The filler particles extend from the first polymer layer into the second polymer layer, thereby bonding or locking the first polymer layer and second polymer layer together. Without wishing to be bound by any theory, it is believed that the first and second polymer layers can form a strong bond with the partially embedded filler particles, thereby bonding or locking the layers together. The shape, surface density and/or orientation of the filler particles may be used to control the strength of the bond. In one example, the filler particles are evenly distributed over the surface of the first polymer layer. The filler particles may have an elongate shape. For instance, the particles may have an aspect ratio of greater than 1, preferably greater than 10, more preferably greater than 100, for example, greater than 500. The filler particles may have an irregular cross-section to enhance bonding between the first polymer layer and the second polymer layer. In one embodiment, the filler particles are fibres. The filler particles may extend at an angle of from 45 to 135 degrees, preferably 60 to 120 degrees, more preferably 80 to 100 degrees from the surface of the first polymer layer. The filler particles or, preferably, fibres may be 1 to 200 microns in length, for example, 50 to 150 microns in length.

The filler particles may be formed of carbon, (for example graphite), metal, metal alloys, glass or other ceramic or polymer or polymer alloys. In one example, the filler particles are fibres of carbon, metal, glass, ceramic or polymer. Suitable polymers include aramid fibres (Kevlar®), polyethylene and polyester fibres.

The filler particles may have surface area (measured using nitrogen, NSA—nitrogen sensitive area) as high as 600 $m^2/gm$ or higher. However, surface area of 100-300 $m^2/gm$ is preferred.

The filler particles may be treated to facilitate bonding with the first polymer layer and/or second polymer layer. For example, the structure of the filler particles may be tailored to facilitate such bonding. Alternatively or additionally, the filler particles may be chemically treated, for example, to facilitate bonding to one or both polymer layers. For example, the filler particles may be functionalised by grafting appropriate functional groups on the particles (e.g. amine or amide groups).

By bonding the first polymer layer to the second polymer layer, it may be possible to produce a composite having a combination of properties. For example, it may be possible to produce a composite having flexibility derived from the first polymer layer and strength derived from the second polymer layer or vice-versa.

By bonding the first polymer layer to the second polymer layer using the present invention, it may also be possible to bond a first polymer layer to a second polymer layer where the polymer layers are incompatible with one another. For example, the first polymer layer may be formed of a thermoplastic material and the second polymer layer may be formed of a thermoset material or vice-versa. In one embodiment, the composite is in the form of a tape. A layer of material may be applied to the first polymer layer and a different layer of material may be applied to a second polymer layer to form a final composite structure. By using a tape according to an embodiment of the invention, it is possible to combine incompatible layers of material together in a single composite.

The inter-laminar strength (peel strength) of the first and second polymer layer may be at least 30 MPa, preferably at least 50 MPa, more preferably at least 100 MPa. Advantageously, this is considerably greater than the peel strengths (e.g. 5 MPa or less) typically achieved by, for example, calendering two layers (e.g. tapes) of dissimilar materials together, even with the application of temperature. With the composite of the present invention, the inter-laminar strength of the first and second polymer layer may be sufficiently strong to minimise the risk of failure at the interface. The bond between the first polymer layer and second polymer layer may be at least as strong as any one of the polymer layers themselves.

The first polymer layer may be formed of any suitable polymer, for example, thermoset or thermoplastic polymers. Examples of suitable polymers include polyvinylidene fluoride (PVDF); polyamides including Nylon-11 or Nylon-12; and polyethylene (e.g. MDPE/HDPE). Other examples include vinyl ester; epoxy; polyphenylene sulfide (PPS); polyether ether ketone (PEEK); fluoropolymers, including polytetrafluoroethylene (PTFE) and PFA/MFA; polyurethanes and sulphone polymers. A blend of two or more polymers may be employed. Examples of blends include epoxy-polyurethane-vinyl ester and vinyl ester-polypropylene. In one embodiment, the polymer is a polymer composite. For example, the first polymer layer may be formed of a polymer composite comprising reinforcing fillers dispersed in a supporting polymer matrix. Suitable reinforcing fillers include fibres of carbon, glass, ceramic or polymer. Other examples of reinforcing filler particles include nano clays, reactive metal or oxide particles. Examples of suitable matrices include polyvinylidene fluoride (PVDF), polyamides including PA11 or PA12; and polyethylene (e.g. MDPE/HDPE). Other examples include vinyl ester, epoxy, polyphenylene sulfide (PPS), polyether ether ketone (PEEK), fluoropolymers, including polytetrafluoroethylene (PTFE) and PFA/MFA, polyurethanes and sulphone polymers.

The second polymer layer may be formed of any suitable polymer, for example, thermoplastic or thermoset polymers. Examples of suitable polymers include polyvinylidene fluoride (PVDF); polyamides including Nylon-11 or Nylon-12; and polyethylene (e.g. MDPE/HDPE). Other examples include vinyl ester; epoxy; polyphenylene sulfide (PPS); polyether ether ketone (PEEK); fluoropolymers, including polytetrafluoroethylene (PTFE) and PFA/MFA; polyurethanes and sulphone polymers. A blend of two or more polymers may be employed. Examples of blends include epoxy-polyurethane-vinyl ester and vinyl ester-polypropylene. In one embodiment, the polymer is a polymer composite. For example, the second polymer layer may be formed of a polymer composite comprising reinforcing filler particles dispersed in a supporting polymer matrix. Suitable reinforcing fillers include fibres of carbon, glass, ceramic or polymer. Other examples of reinforcing fillers include nano clays, reactive metal or oxide particles. Examples of suitable matrices include polyvinylidene fluoride (PVDF), polyamides including PA11 or PA12; and polyethylene (e.g. MDPE/HDPE). Other examples include vinyl ester, epoxy, polyphenylene sulfide (PPS), polyether ether ketone (PEEK), fluoropolymers, including polytetrafluoroethylene (PTFE) and PFA/MFA, polyurethanes and sulphone polymers.

Where a polymer composite comprising reinforcing fillers in a supporting matrix is used as the first and/or second polymer layer, the reinforcing filler particles may be randomly aligned in the bulk of the layer. The filler particles at the interface between the first and second polymer layers may be aligned in a different manner to the particles in the bulk of the first and/or second polymer layers. For example, at least 50%, preferably at least 75% of the filler particles at the interface may be fibres that are aligned such that they are at an angle of from 45 to 135 degrees, preferably 60 to 120 degrees, more preferably 80 to 100 degrees to the interface between the first and second polymer layers. In one embodiment, the bulk or substantially all the filler particles at the interface are fibres that extend substantially perpendicularly to the interface between the first and second polymer layers. The filler particles in the remainder of the polymer layer(s) may be aligned differently, for example, they may be dispersed in a random manner throughout the supporting matrix.

The filler particles that join the first polymer layer to the second polymer layer may be the same or different to any filler particles used to reinforce the first and/or second polymer layers.

The first polymer layer may be different from the second polymer layer. For example, the first polymer layer may be formed of a different polymer from the second polymer layer. Alternatively, the first polymer layer may be formed of the same polymer but have a different polymer composition or be of a different polymer grade from the second polymer layer. The first polymer layer may have different properties from the second polymer layer. In one embodiment, the first polymer layer and second polymer layer are not compatible and do not form a strong bond by e.g. conventional thermal bonding techniques.

In one embodiment, one or both of the first polymer layer and the second polymer layer is formed of a polymer composite comprising reinforcing fibres dispersed in a supporting polymer matrix. At least one of the layers, therefore, may have reinforcing fibres distributed throughout the layer. The filler particles (e.g. fibres) that facilitate bonding between the first polymer layer and second polymer layer, however, may only be present at the interface between the first polymer layer and the second polymer layer. Where the filler particles are fibres, these fibres may be formed of the same or different material to the reinforcing fibres present in the polymer composite of the first or second polymer layer. In one example, one polymer layer is a polymer composite comprising reinforcing fibres, while the other polymer layer is devoid of reinforcing fibres.

The present invention also provides a method of making a composite as described herein, said method comprising:
  incorporating filler particles into the first polymer layer, whereby the filler particles are partially embedded in the first polymer layer and extend beyond a surface of the first polymer layer,
  applying a polymer to said surface of the first polymer layer to form the second polymer layer, whereby the filler particles extending beyond the surface of the first polymer layer are also embedded in the second polymer layer.

The method may comprise providing the filler particles as a web of fibre material. The web may be a mat or felt of fibrous material. The web may be formed of knitted or stitched fibres or may be formed of chopped or irregular fibres pressed together. Alternatively, the web may comprise a foam of fibrous material.

The web may be pressed onto the first polymer layer to incorporate the filler particles (e.g. fibres) into the first polymer layer. In one embodiment, the web is pressed such that the web is only partially embedded in the first polymer layer and extends sufficiently beyond the surface of the first polymer layer to allow an adequate bond to be formed with the second polymer layer. In another embodiment, the web may be embedded into the first polymer layer and, subsequently, part of the first polymer layer may be removed, for example, by mechanical or solvent means. By removing part of the first polymer layer in this manner, the filler particles (e.g. fibres) may be exposed to a greater extent, such that they extend beyond a surface of the first polymer layer to allow an adequate bond to be formed with the second polymer layer.

In one embodiment, the web is pressed onto the first polymer layer while the first polymer layer is sufficiently deformable to allow the web to be at least partially embedded. In one example, the first polymer layer may be softened at an elevated temperature or may be contacted with the web before the first polymer layer is fully cured. The second polymer layer may then be applied to the first polymer layer to form the composite. The second polymer layer may be applied in liquid form and allowed to set around the projecting filler particles (e.g. fibres) to form the composite. For example, the second polymer layer may be a liquid epoxy resin that is applied in liquid form and then subsequently set around the projecting filler particles. Alternatively, the second polymer may be applied in a deformable state, for example, at elevated temperature or pre-curing to ensure that the filler particles extending from the surface of the first polymer layer are also embedded in the second polymer layer. The polymer layers may then be set, for example, by cooling and/or curing.

The composite may be formed by calendaring, for instance, by calendaring the first polymer layer, the web and the second polymer layer. Alternatively, the first polymer layer, the web and the second polymer layer may be co-extruded to form the composite.

The composite may be employed in a range of applications in a flexible pipe body. For example, the composite may be used to form one or more pressure armour layers in the pipe body. The primary load on such layers is formed from radial forces. Pressure armour layers often have a specific cross section profile to interlock so as to be able to maintain and absorb radial forces resulting from outer or inner pressure on the pipe. When pressure armour layers are helically wound forming hoop components, the radial forces from outer or inner pressure on the pipe cause the hoop components to expand or contract, putting respectively a compressive or tensile load on the helically wound layer. The cross sectional profile of the windings which thus prevent the pipe from bursting or collapsing as a result of pressure are sometimes called pressure-resistant profiles. Applying a composite of the present invention as pressure armour may be advantageous in enabling, for example, the bonding of a high glass transition temperature material to a lower glass transition temperature material in order to form a composite of the two with improved temperature resistance. In another embodiment, a less chemically resistant (but more cost effective) outer layer may be bonded onto the outside of a chemically resistant inner layer which is exposed to the service fluid, providing a composite of enhance chemical resistance at lower cost.

By using the composite of the present invention, it is also possible to stiffen a smoothbore pipe design in external hydrostatic loading. For example, in one embodiment, a thermoplastic liner of, for instance, PVDF, may be stiffened by pressing a web or tape of fibre material (e.g. carbon fibre) onto the external surface of the liner. This incorporates the fibres into the first polymer layer, ensuring that the fibres partially embedded in the liner and extend beyond the outer surface of the first polymer layer. A thermoplastic composite hoop pressure armour layer formed from, for example, PVDF reinforced with carbon fibre is applied to the tape whereby the fibres extending beyond the surface of the liner are embedded in the hoop pressure armour layer. As a result, a composite multi-layered structure is formed from the liner and the hoop pressure armour layer, whereby the layers are bonded or locked by virtue of the embedded carbon fibres.

In many flexible pipe designs the pipe body includes one or more tensile armour layers, typically formed by helically wound tensile armour wires. The primary loading on such a layer is tension. In high pressure applications, such as in deep and ultra-deep water environments, the tensile armour layer experiences high tension loads from a combination of the internal pressure end cap load and the self-supported weight of the flexible pipe. This can cause failure in the flexible pipe since such conditions are experienced over prolonged periods of time. The composite of the present invention may be used to form one or more of the tensile armour layers in the pipe body. Utilising the present invention, the tensile armour wires may also be designed to have a gradient of properties through thickness. Additionally armour wires formed from the composite of the present invention may have improved overall transverse properties and/or be disposed to resist or prevent failure due to abrasion, wear and other contact forces acting between layers in the flexible pipe.

Tapes are also used in the structure of the flexible pipes in order to prevent radial or lateral birdcaging of the wires when the pipe is subjected to axial compression; birdcaging is the displacement of the wires from their desired/designed position either in the radial direction or from their consistent angular helical alignment in the pipe. Tapes manufactured using composites of the present invention may replace multiple layers of other types of un-bonded tapes. This may improve the efficiency of the tape layer in the pipe structure and make the application of such tape layers to the desired or designed thickness and/or strength or modulus simpler or more efficient during pipe manufacture. The joining of tapes and particularly tapes of dissimilar materials is made possible through the use of composites of the present invention. An additional benefit of the use of tapes comprising the composites of the present invention is that, such tapes can be used without metallic reinforcement or bonding. This improves the resistance of the resulting pipe to degradation from acid gas species such as hydrogen sulphide.

The flexible pipe may have end fittings for connecting segments of flexible pipe body together or for connecting them to terminal equipment such as a rigid sub-sea structures or floating facilities. As such, amongst other varied uses, flexible pipe can be used to provide a riser assembly for transporting fluids from a sub-sea flow line to a floating structure. In such a riser assembly a first segment of flexible pipe may be connected to one or more further segments of flexible pipe. Each segment of flexible pipe includes at least one end fitting. The composite of the present invention may be used to couple composite or metal tensile armour wires with polymer such as epoxy or other material used in end fittings.

Figure 2:
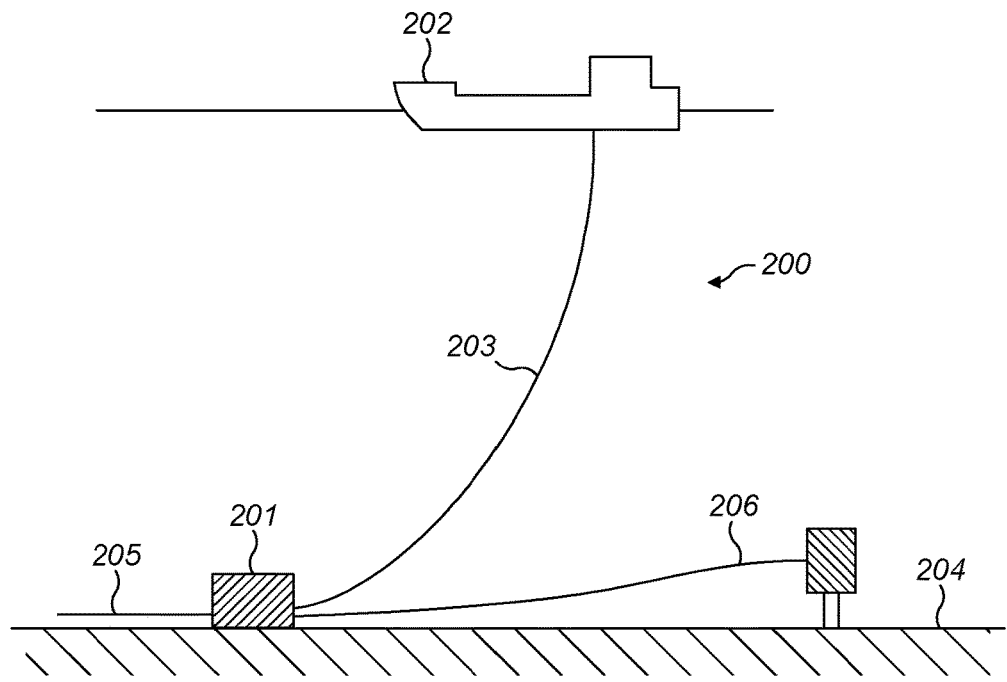

Embodiments of the invention are further described hereinafter with reference to the accompanying drawings, in which:

FIG. 1 illustrates a flexible pipe comprising at least one part formed from a composite according to an embodiment of the present invention, and FIG. 2 illustrates how portions of flexible pipe can be utilised as a flow line 205 or jumper 206.

In the drawings like reference numerals refer to like parts.

Throughout this description, reference will be made to a flexible pipe. It will be understood that a flexible pipe is an assembly of a portion of a pipe body and one or more end fittings in each of which a respective end of the pipe body is terminated. FIG. 1 illustrates how pipe body 100 is formed in accordance with an embodiment of the present invention from a combination of layered materials that form a pressure-containing conduit. Although a number of particular layers are illustrated in FIG. 1, it is to be understood that the present invention is broadly applicable to coaxial pipe body structures including two or more layers manufactured from a variety of possible materials. For example, the pipe body may be formed from polymer layers, composite layers, metallic layers or a combination of different materials. It is to be further noted that the layer thicknesses are shown for illustrative purposes only.

As illustrated in FIG. 1, a pipe body includes an optional innermost carcass layer 101. The carcass provides an interlocked construction that can be used as the innermost layer to prevent, totally or partially, collapse of an internal pressure sheath 102 due to pipe decompression, external pressure, and tensile armour pressure and mechanical crushing loads. The carcass layer is often a metallic layer, formed from stainless steel, for example. The carcass layer could also be formed from polymer, or other material, or a combination of materials. In one example, a composite according to the present invention may be employed to form the carcass layer. It will be appreciated that certain embodiments of the present invention are applicable to 'smooth bore' operations (i.e. without a carcass layer) as well as such 'rough bore' applications (with a carcass layer).

The internal pressure sheath 102 acts as a fluid retaining layer and comprises a polymer layer that ensures internal fluid integrity. It is to be understood that this layer may itself comprise a number of sub-layers. It will be appreciated that when the optional carcass layer is utilised the internal pressure sheath is often referred to by those skilled in the art as a barrier layer. In one embodiment, the internal pressure sheath (e.g. barrier layer or liner) may be formed using a composite according to an embodiment of the present invention. In operation without such a carcass (so-called smooth bore operation) the internal pressure sheath may be referred to as a liner.

An optional pressure armour layer 103 is a structural layer that increases the resistance of the flexible pipe to internal and external pressure and mechanical crushing loads. The layer also structurally supports the internal pressure sheath, and typically may be formed from an interlocked construction of wires wound with a lay angle close to 90°. The pressure armour layer is often a metallic layer, formed from carbon steel, for example. The pressure armour layer could also be formed from polymer, or other material, or a combination of materials. In one embodiment, a composite according to an embodiment of the invention may be used to form the pressure armour layer. A composite according to an embodiment of the invention may also be positioned between two overlapping pressure armour layers.

The flexible pipe body also includes an optional first tensile armour layer 105 and optional second tensile armour layer 106. Each tensile armour layer is used to sustain tensile loads and internal pressure. The tensile armour layer is often formed from a plurality of wires (to impart strength to the layer) that are located over an inner layer and are helically wound along the length of the pipe at a lay angle typically between about 10° to 55°. The tensile armour layers are often counter-wound in pairs. The tensile armour layers are often metallic layers, formed from carbon steel, for example. The tensile armour layers could also be formed from polymer or other material, or a combination of materials. A composite according to an embodiment of the invention may also be employed as an optional tensile armour layer.

The flexible pipe body shown also includes optional layers of tape 104 which help contain underlying layers and to some extent prevent abrasion between adjacent layers. The tape layer may be a polymer or a combination of materials. The composite of the present invention may be used as tape. Alternatively or additionally, other composites may be used.

The flexible pipe body also typically includes optional layers of insulation 107 and an outer sheath 108, which comprises a polymer layer used to protect the pipe against penetration of seawater and other external environments, corrosion, abrasion and mechanical damage. The composite of the present invention may be used as insulation and/or the outer sheath.

Each flexible pipe comprises at least one portion, sometimes referred to as a segment or section of pipe body 100 together with an end fitting located at at least one end of the flexible pipe. An end fitting provides a mechanical device which forms the transition between the flexible pipe body and a connector. The different pipe layers as shown, for example, in FIG. 1 are terminated in the end fitting in such a way as to transfer the load between the flexible pipe and the connector.

FIG. 2 also illustrates how portions of flexible pipe can be utilised as a flow line 205 or jumper 206.

It will be clear to a person skilled in the art that features described in relation to any of the embodiments described above can be applicable interchangeably between the different embodiments. The embodiments described above are examples to illustrate various features of the invention.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

COMPARATIVE EXAMPLE A

In this Comparative Example, a first polymer tape layer formed from a thermoset material was calendared to a second polymer matrix tape layer formed from a PVDF material at elevated temperature. The tape layers did not form a good bond (peel strength of <5 MPa).

EXAMPLE 1

In this Example, a web of carbon fibre material was partially embedded into a first polymer tape layer formed from a PVDF material, such that at least some of the carbon fibres extended beyond the surface of the first polymer tape layer. A second polymer matrix tape layer formed from a polyamide material was applied to the first polymer tape layer, whereby the carbon fibres extending beyond the surface of the first polymer tape layer were embedded in the second polymer tape layer. A strong bond (peel strength >30

MPa) was formed between the first and second polymer tape layers in the resulting composite.

The invention claimed is:

1. A flexible pipe body for subsea transportation of production fluids, the flexible pipe body comprising:
    an internal pressure sheath;
    one or more pressure armor layers, wherein the one or more pressure armor layers is formed from an interlocked construction; and
    one or more tensile armor layers, wherein the one or more tensile armor layers is helically wound,
        wherein at least one tensile armor layer and/or at least one pressure armor layer is formed from a composite, wherein said composite comprises:
        a first polymer layer;
        a second polymer layer that is bonded to the first polymer layer; and
        filler particles that extend from the first polymer layer into the second polymer layer, whereby the filler particles are partially embedded in both the first and second polymer layers,
            wherein the filler particles include carbon fibers having a specific surface area of 100-300 m$^2$/g and a length of 1 to 200 μm,
    where the first polymer layer is formed from a thermoplastic matrix material selected from the group consisting of polyvinylidene fluoride, polyethylene, polyphenylene sulfide, polyether ether ketone, sulfone polymer, and combinations thereof, and where the second polymer layer is formed from a thermosetting matrix material comprising a polyamide, and
    where the peel strength between the first polymer layer and the second polymer layer is at least 30 MPa.

2. The flexible pipe body as claimed in claim 1, wherein at least one of the thermoplastic matrix material and the thermosetting matrix material comprises reinforcing fibers dispersed therein.

3. The flexible pipe body as claimed in claim 2, wherein the reinforcing fibers are different from the filler particles.

4. The flexible pipe body as claimed in claim 1, wherein the composite is in the form of a tape.

5. The flexible pipe body as claimed in claim 1, wherein the thermoplastic matrix material is polyvinylidene fluoride.

* * * * *